(12) United States Patent
Fleeter et al.

(10) Patent No.: US 6,283,416 B1
(45) Date of Patent: Sep. 4, 2001

(54) SPACECRAFT KERNEL

(75) Inventors: Richard D. Fleeter, Reston, VA (US); Scott A. McDermott, Washington, DC (US)

(73) Assignee: Aero Astro, Inc., Herndon, VA (US)

( * ) Notice: Subject to any disclaimer, the term of this patent is extended or adjusted under 35 U.S.C. 154(b) by 0 days.

(21) Appl. No.: 09/337,154

(22) Filed: Jun. 21, 1999

(51) Int. Cl.[7] .............................. B64G 1/10; B64G 1/00; B64G 1/22; G06F 17/00; G06F 7/00; G05D 1/00; G05D 3/00

(52) U.S. Cl. .............................. 244/176; 701/3; 701/13; 244/158 R

(58) Field of Search .................... 701/13, 3; 244/176, 244/167; 455/427; 710/14

(56) References Cited

U.S. PATENT DOCUMENTS

| | | | |
|---|---|---|---|
| 4,670,855 | * 6/1987 | Caprio et al. | 364/900 |
| 5,175,555 | * 12/1992 | Holak et al. | 342/175 |
| 5,211,360 | * 5/1993 | Zimbelman | 244/164 |
| 5,692,707 | * 12/1997 | Smay | 244/165 |
| 5,949,766 | * 9/1999 | Ibanez-Meier et al. | 370/316 |
| 5,951,609 | * 9/1999 | Hanson et al. | 701/13 |
| 5,966,658 | * 10/1999 | Kennedy, III et al. | 455/426 |
| 6,104,925 | * 8/2000 | Grube et al. | 455/428 |

* cited by examiner

Primary Examiner—Charles T. Jordan
Assistant Examiner—Christian M. Best
(74) Attorney, Agent, or Firm—Robert M McDermott, Esq

(57) ABSTRACT

A spacecraft architecture is defined that distinguishes components and sub-systems based on both functional and physical dependencies. On one side of the interface are kernel components that are both functionally and physically independent of the vehicle configuration and functionally and physically independent of the mission-specific system. On the other side of the interface are components that depend on either the spacecraft configuration or the mission-specific system. The kernel components can be included in a variety of spacecraft, independent of the spacecraft architecture and independent of the spacecraft mission. The kernel includes a communications system for communicating with an earth station, a command and data handling processor, and a power regulation and distribution system. The preferred kernel is extensible by allowing the selection of different capacity components within the kernel, each different capacity component utilizing the same standardized interface for communicating with the vehicle and mission-specific components. By providing a standardize interface and extensible kernel, design changes do not propagate beyond the standardized interface, thereby substantially damping the costly ripple effect typically associated with changes that are introduced late in the design cycle.

20 Claims, 1 Drawing Sheet

SPACECRAFT KERNEL

BACKGROUND OF THE INVENTION

1. Field of the Invention

This invention relates to the field of aerospace, and in particular to the field of spacecraft system architecture and design.

2. Description of Related Art

All spacecraft have substantially the same basic requirements: power, communications, guidance, navigation, control, and command and data handling. Conventionally, the design of a spacecraft, such as a satellite system, is effected by partitioning the spacecraft into two independent sub-systems: a payload system and a transport system. The payload system comprises the mission-specific equipment, such as a collection system that collects data in a research satellite, a relay system that retransmits signals in a communications satellite, and so on. The transport system, or "bus", comprises the equipment required to effect the mission in space, including: the power generation and storage system, the attitude determination and control system, the command and data handling system, the communications system, and the infra-structure and super-structure to support each of the components of each system.

Although the functional partitioning of tasks between payload and transport systems provides the desired degree of functional independence for effective system design, the physical constraints inherent in spacecraft design often forces a structural dependence that minimizes the advantages that can be gained by this functional partitioning. For example, spacecraft missions often involve the collection of data. The arrangement of the solar panels that provide power to the spacecraft, the design of the attitude control system, and other spacecraft specific designs will be dependent upon the particulars of the collection equipment. If the mission is to visually collect data related to the earth's surface, for example, the solar panels must be arranged so as not to obscure the view of the earth, and the spacecraft must be controlled to orient the visual collection device toward the earth. Conversely, if the mission is to measure the effects of weightlessness on crystal growth, the solar panels can be placed anywhere on the exterior of the spacecraft, whereas the spacecraft propulsion and control system must be designed to minimize acceleration in any direction.

In like manner, the demands on spacecraft sub-systems, such as the communications system and the power generation systems, are substantially affected by mission-specific requirements. Typically, the payload and transport systems are designed using a specified allocation of power and bandwidth among the components. As the designs of the payload system and the transport system progress independently, issues arise when the actual requirements exceed the anticipated requirements. When such issues arise, a choice typically must be made between increasing the allocation of resources to the component requiring the additional resources, or decreasing the capabilities of the component to conform to the specified allocation. Increasing the allocation often requires a redesign of the transport system components that provide the resource, while decreasing the capabilities to conform to the specified allocation often requires a redesign of the payload system. Often, the determination of the actual requirements of each component or sub-system does not occur until a substantial portion of each system is designed. As is known in the art, the cost of design changes, in time, effort, and materials, typically increases exponentially with respect to the degree of completion of the design, and there is a very high cost associated with changes that occur late in the design cycle.

The overall structure of the transport system is also substantially dependent upon the payload requirements. The transport system typically provides the mechanical load-bearing structure to contain each of the components and sub-systems. As in the case of power and bandwidth allocation, space and weight are allocated among components. When an actual requirement exceeds the allocation, a redesign of the transport or payload system, or both, is typically required.

The above noted interdependencies, and others, between the payload system and the transport system are often a major contributing factor to the high cost, in time, effort, and material, of conventional spacecraft development programs. Because of the interdependencies imposed between the payload and transport systems, costly redesigns are often required late in the development cycle, when actual requirements and dependencies become known. Because of the interdependencies imposed between the payload and transport systems, the re-use of systems or sub-systems among spacecrafts having different missions is a sought-after but often unachievable goal.

BRIEF SUMMARY OF THE INVENTION

It is an object of this invention to provide a spacecraft architecture that facilitates independent sub-system design and development. It is a further object of this invention to provide a method and apparatus that facilitates the reuse of spacecraft sub-system designs. It is a further object of this invention to provide a method and apparatus that facilitates the extension of a spacecraft sub-system design without introducing substantial system interdependencies. It is a further object of this invention to provide a mission-independent sub-system design that can be used on a variety of spacecraft.

These objects and others are achieved by providing a standard interface that is spacecraft and mission independent. This interface is structured to distinguish components and sub-systems based on both functional and physical dependencies. On one side of the interface are kernel components that are both functionally and physically independent of the vehicle configuration and functionally and physically independent of the mission-specific system. On the other side of the interface are components that depend on either the spacecraft configuration or the mission-specific system. In a preferred embodiment, the kernel components are organized and structured as a kernel sub-system that can be included in a variety of spacecraft, independent of the spacecraft architecture and independent of the spacecraft mission. In a preferred embodiment, the kernel includes a communications system for communicating with an earth station, a command and data handling processor, and a power regulation and distribution system. The preferred kernel is extensible to include, for example, low-level functions, such as clock signaling and data buffering, as well as high-level functions, such as a navigation and attitude information processing system, a propulsion control system, and other mission and spacecraft independent processors and control devices. The preferred kernel is also extensible by allowing the selection of different capacity components within the kernel, each different capacity component utilizing the same standardized interface for communicating with the vehicle and mission-specific components. By providing a standardize interface and extensible kernel, design changes do not propagate beyond the standardized interface, thereby substantially damping the costly ripple effect typically associated with changes that are introduced late in the design cycle.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
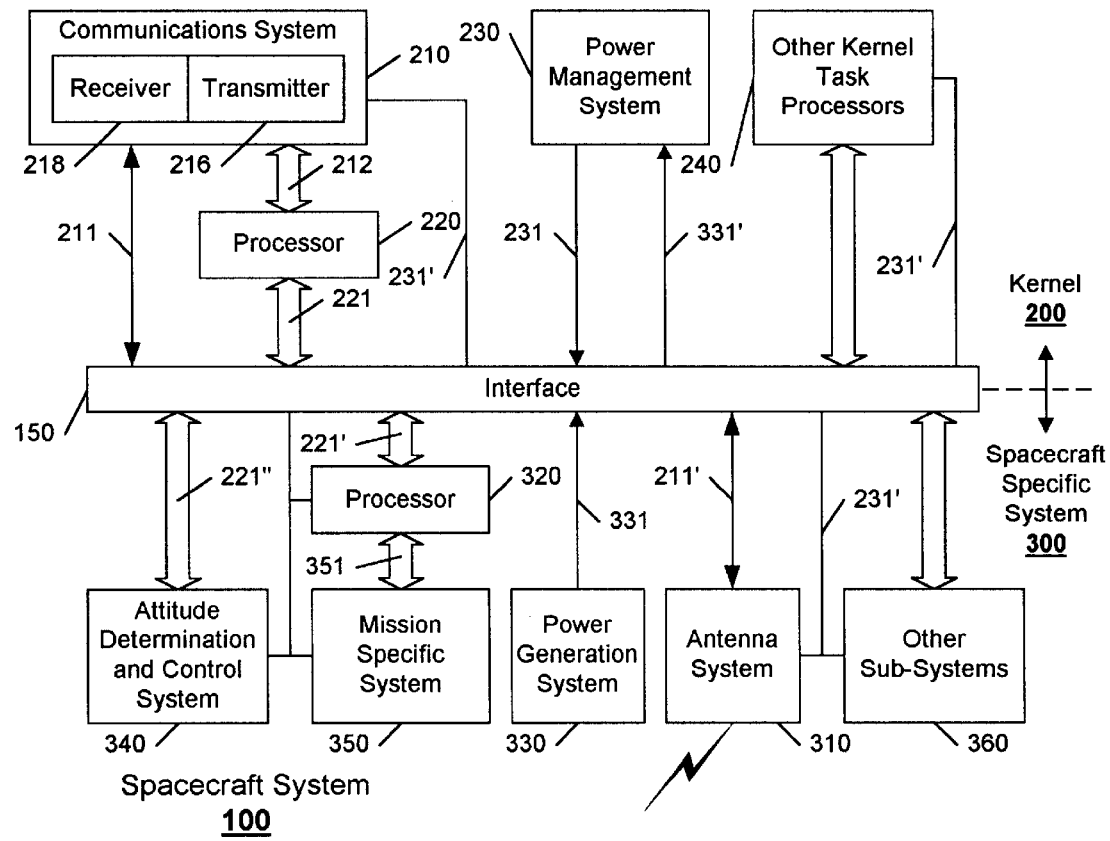
FIG. 1 illustrates an example block diagram of a spacecraft system in accordance with this invention.

FIG. 1 illustrates an example block diagram of a spacecraft system 100 in accordance with this invention. The spacecraft system 100 includes an interface 150 for the communication of information and other signals between a kernel system 200 and a vehicle/mission-specific system 300. For ease of reference, the term spacecraft-specific is used herein to refer to either vehicle-specific or mission-specific items. The kernel system 200 includes components that are common among spacecraft, and are not dependent upon the physical configuration of the spacecraft. In a preferred embodiment of this invention, the kernel 200 includes a communications system 210, a processor 220, and a power management system 230. As contrast to conventional spacecraft design, the logical partitioning of components in accordance with this invention includes physical configuration considerations. Note, for example, that the communications system 210 does not include the antenna system 310 that is conventionally associated with a communications system. In like manner, the power management system 230 does not include the power generation system 330. By including physical considerations in the determination of logical partitioning, the kernel components can be readily used in a variety of spacecraft.

The power management system 230 receives unregulated power 331' from the power generation system 330 via the standard interface 150, and provides therefrom regulated power signals 231. The regulated power signals 231 are communicated via the interface 150 as regulated power signals 231' to each spacecraft component or sub-system that requires regulated power. The power management system 230 includes components for power balancing, voltage and current regulation, and overload protection, as well as a power storage sub-system, such as a battery sub-system, for auxiliary power when the power generation system 330 does not provide sufficient power 331. The regulated power signals 231 include a variety of voltage and current outputs. In a minimal embodiment of the power management system 230, the regulated power output 231 comprises power from the power generation system 330 that is regulated to be below a specified voltage or current level; in a preferred embodiment of the power management system 230, the regulated power output 231 also includes regulated +3 and +5 volt outputs for powering commonly available electronic devices. Note that, in accordance with this invention, the components of the power management system 230 can be provided without the aforementioned considerations typically required to conform the power generation devices, such as solar panels, to the mission-specific physical constraints. As would be evident to one of ordinary skill in the art, the design of the power generation system 330 must be designed to conform to the mission-specific physical constraints, but, if designed in accordance with the principles of this invention, the power management system 230 is not affected by this design conformance.

The standard interface 150 in accordance with this invention includes a specification for the power generation system 330. These specifications include, for example, a minimum power input as a function of the output 231 load, a maximum below-limit time as a function of the output 231 load and the capacity of the power storage sub-system, and other factors that affect the design of the power generation system 330, common to one of ordinary skill in the art. In a preferred embodiment of this invention, alternative power management systems 230 are provided so as to minimize the cost and weight demands of the kernel 200 in dependence upon the specified output 231 load. In accordance with this invention, however, the particular choice of power management system 230 is transparent to the interface 150, and transparent to the spacecraft-specific system 300. Provided that the power generation system 330 conforms to the specifications corresponding to a required output 231 load, the power management system 230 supplies the required output 231 load independent of the particular configuration of solar cells, mission-specific equipment, and the like.

The communications system 210 includes a transmitter 216 and a receiver 218 for communicating with an earth station. Note, however, that the corresponding antenna system 310 is not included in the kernel 200, because although the antenna system 310 is functionally independent of all components except the communications system 210, the antenna system 310 is likely to be dependent upon the physical configuration of the spacecraft-specific components. In a preferred embodiment, the frequency of operation of the transmitter 216 and receiver 218 are presettable to specified frequencies in the X-band (7–12 GHz), and the standard interface 150 includes a specification for an antenna system compatible with this frequency band. Other frequency bands may also be used, with an accompanying change to the interface specification. The communications system 210 handles all command and control signaling for the spacecraft and mission-specific system 350, as well as the data communications from, for example, a mission-specific collection device. In a preferred embodiment of this invention, alternative transmitters 216 and receivers 218 are available for use in the communications system 210, based on bandwidth requirements for transmitting or receiving data. In accordance with this invention, however, the information 221 that is provided to the interface that corresponds to communications via the communication system 210 is standardized to be independent of the particular selected transmitter 216 or receiver 218.

The processor 220 provides the resources for the conventional "housekeeping" tasks associated with a deployed spacecraft, such as controlling and monitoring each of the spacecraft sub-systems, activating routine operations in response to received stimuli, and so on. In accordance with this invention, the processor 220 also provides the network protocol and management functions to effect the standardized communication of data and commands via the interface 150. One of the fundamental tasks of the processor 220 is the translation and routing of data and commands to the proper sub-systems, via the standard interface 150. Generally, commands are received from an earth-station, and data is transmitted to the earth-station. The processor 220 processes the commands from the receiver 218 and produces the appropriate commands that are communicated to the intended sub-system via the standard interface 150. The commands from the earth-station via the receiver 218 typically effect a modification to one or more parameters of the corresponding sub-system, to change, for example, the spacecraft's orientation, the criterion used in the mission-specific data collection devices, and so on. In like manner, the processor 220 receives communications from each of the spacecraft sub-systems via the standard interface 150 and produces the corresponding data that is transmitted to the earth station via the transmitter 216. Note that in this manner, the spacecraft-specific components and sub-systems are isolated from the particular protocol or other parameters of the earth-to-spacecraft communications link, and changes to the details of the communications link will not affect the design of the spacecraft sub-system communications via the standard interface 150. For example, the mission-specific system 350 may include a data collection system that communicates mission-data 221' to the standard interface 150 in the standard format. A change to the particular means employed to communicate this data to the earth station may affect the communications 212 between the processor 220 and the transmitter 216, but will not affect the components beyond the standard interface 150.

To ease the interconnection task, a preferred embodiment of this invention comprises a serial interface, such as RS-485 (also termed multi-drop RS-422) for communicating data, using embedded addresses within each data packet to route each packet. Common networking protocols, such as CANbus, IEEE-1394, I$^2$C, Mil-Std 1553/1773, and the like, can also be used. Alternative embodiments of the kernel 200 use different protocols, to facilitate different communications schemes. An embodiment of the kernel 200 that includes the CANbus, for example, provides an easy to use interface for rapid broadcast communications among elements, but is not well suited for large quantities of data communications. An embodiment of the kernel 200 that includes IEEE-1394 is more difficult to interface with, but provides for very high speed data communications. The processor 220 in a preferred embodiment provides the network and protocol functions required to support the network operation via the standard interface 150. The processor 220 in a preferred embodiment also provides ancillary signaling, such as a standard common clock signal to facilitate a synchronization among spacecraft sub-systems, as required, and discrete digital input/output ports for interface signaling, via the standard interface 150. As required, alternative processors 220 may be provided, depending upon the processing speed and bandwidth requirements of the overall spacecraft system 100. In accordance with this invention, however, given the selected protocol, the choice of an alternative processor 220 will be transparent to the interface 150, and transparent to the vehicle and mission-specific sub-system 300.

By providing the above standard interface 150 and kernel 200, the mission-specific system 350 can be designed and verified based on a loosely specified allocation of resources. The particular communications equipment 210, processor 220, and power management 230 components are selected after the design of the mission-specific system 350 is refined to the extent required to determine actual resource requirements. Thereafter, the remaining sub-systems can be designed or selected, based on fairly well defined sub-system requirements. Note that by providing a well defined interface 150, the design of the mission-specific sub-system 350 can progress without interference from the dependencies, for example, of the particular choice of communications equipment 210. If an alternative receiver 218 becomes available that is less costly, for example, it can be utilized without impacting the mission-specific system, because, in accordance with this invention, the communications 221 via the standard interface 150 remain the same. In like manner, an alternative power generation system can be developed without impacting any other component, provided that it provides power in conformance with the aforementioned specifications associated with the interface 150. That is, by providing a standard interface 150 in accordance with this invention, the effect of a design change in a particular component or sub-system is substantially dampened by the standard interface 150. Note also that by providing an interface 150 that partitions components and sub-systems based on physical as well as functional dependencies, the interface 150 and kernel sub-system 200 can be embodied in a variety of spacecraft, independent of the spacecraft's structure or particular mission.

Illustrated in FIG. 1 are a variety of components and sub-systems that form the vehicle and mission-specific sub-system 300. As mentioned above, the antenna system 310 provides the communications 211' to and from an earth station (not shown) from and to the communications system 210 via the standard interface 150. As in the case of the power generation system 330, the requirements for the antenna system 310 are contained in a specification that is associated with the standard interface 150. The specification includes, for example, the maximum allowable routing distance from the interface 150 at a given frequency band, the required signal to noise ratio at the receiver 218, a minimum and maximum power output from the transmitter 216, the input or output impedances, and so on.

A processor 320 facilitates communications 221' between the mission-specific system 350 and the kernel 200, via the standard interface 150. As noted above, by providing the standard interface 150, the communications system 210 in the kernel 200 can be designed independent of the communications 351 and protocol of the mission-specific system 350. As also noted above, alternative versions of the protocol used by the standard interface 150 may be provided, each requiring a different level of complexity for translating to and from the standard interface 150. Thus, the complexity of the processor 320 can range from a mere serial data interface device to a high speed IEEE-1394 ("Firewire") interface device. Note, however, that the choice of the protocol of the standard interface 150 is loosely based on the quantity of data that is expected to be transmitted, and is preferably made at the commencement of the mission-specific design program.

An attitude determination and control system 340 controls the orientation and trajectory of the spacecraft. In a preferred embodiment of this invention the attitude determination and control system 340 is designed to communicate directly 221" with the kernel system 200 via the standard interface 150, so as to obviate the need for a processor similar to the processor 320 to transform communications to and from different protocols. The selected communications protocol used for data transfer via the standard interface 150 allows for a multiplexing and routing of communications from the earth station to each spacecraft sub-system, such as the attitude determination and control system 340, and the mission-specific system 350, using, for example, a packet protocol with destination addressing.

Other spacecraft or mission-specific sub-systems 360 are similarly configured to communicate with the kernel system 200, using the aforementioned standard protocol of the interface 150, or using a separate processor, or the processor 320, to effect a communications protocol translation to the standard protocol of the standard interface 150. These other sub-systems 360 receive their power 231' from the power management system 230, via the standard interface 150.

Illustrated in FIG. 1 are other kernel task processors 240. Such processors 240 may include, for example, position and attitude determination aids, processors for determining propulsion parameters, and so on. Other processors 240 provide general purpose services to the spacecraft, and may include, for example, a memory management processor with associated memory, providing each component of the spacecraft 100 a means for storing and retrieving data as required. Such processors 240 in a preferred embodiment are configured to communicate via the protocols established for the standard interface 150, and will receive power 231' from the standard interface 150.

Figure 2:
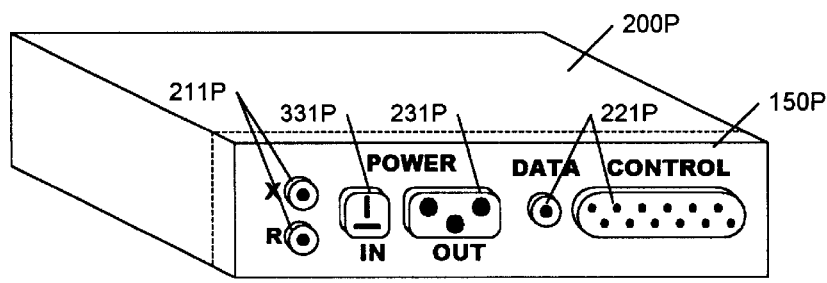
FIG. 2 illustrates an example kernel and interface in accordance with this invention.

Because the interface 150 and kernel 200 are well defined, and independent of spacecraft and mission-specific components at both a physical and functional level, a kernel module can be provided that includes one or more of the above defined kernel components. FIG. 2 illustrates an example kernel module 200P with an integrated standard interface 150P. In FIG. 2, the "P" suffix on the reference numerals indicate a physical embodiment of the corresponding reference items in FIG. 1. As discussed above, because the kernel 200 and interface 150 are spacecraft and mission independent, the physical embodiment 200P, 150P illustrated in FIG. 2 can be used in a variety of spacecraft, independent of the spacecraft's configuration and mission. In a preferred embodiment, the embodiment 200P, 150P can be made available at the commencement of a spacecraft development process, thereby facilitating the development of spacecraft and mission-specific components and systems with minimal interdependencies and minimal ripple-effect delays and costs.

The foregoing merely illustrates the principles of the invention. It will thus be appreciated that those skilled in the art will be able to devise various arrangements which, although not explicitly described or shown herein, embody the principles of the invention and are thus within its spirit and scope. For example, as experience is gained in the use and benefits provided by the use of kernel components that are both physically and functionally independent of the spacecraft and mission, other tasks will be partitioned so as conform to this paradigm, and additional kernel processes will be identified and appropriate standards established for accessing these processes via the standard interface 150.

The particular functional partitionings in the figures are presented for illustrative purposes, and alternative partitionings will be evident to one of ordinary skill in the art. For example, the processor 220 may include the functional control components of the power management system 230. In like manner, if excess capacity is available on the processor 220, tasks from other spacecraft sub-systems, on either side of the interface 150, can be effected within the processor 220. In a preferred embodiment, each of these additional tasks are structured and maintained as independent tasks from the kernel tasks discussed above. Similarly, the various components and sub-systems may be embodied in hardware, software, or a combination of both. For example, the network management task of the processor 220 may be effected via a gate-array device that is preprogrammed to effect the network management, while the interface from the processor 220 to the transmitter 216 may be via a program that is run on a general purpose computing device, and so on. Such modifications and extensions to the concepts presented herein will be evident to one of ordinary skill in the art in light of this disclosure, and within the scope of the following claims.

We claim:

1. A spacecraft kernel having a standard electrical interface for communicating with one or more spacecraft sub-systems, comprising:

a standard electrical interface on the spacecraft kernel for communicating with one or more spacecraft sub-systems, a receiver that is configured to receive commands from an earth station, a transmitter that is configured to transmit data to the earth station, and a processor, operably coupled to the receiver and the transmitter, that is configured to:

process the commands from the earth station and produces therefrom sub-system commands, process communications from the one or more spacecraft sub-systems and produces therefrom the data that is transmitted to the earth station;

wherein the standard electrical interface is operably coupled to the processor and the one or more spacecraft sub-systems, and is configured to:

provide the sub-system commands to the one or more spacecraft sub-systems in a standard format, and receive the communications from the one or more spacecraft sub-systems in the standard format.

2. A spacecraft kernel having a standard electrical interface for communicating with one or more spacecraft sub-systems, comprising:

a power management system that is configured to receive a variable power input and produces therefrom a regulated power output, a receiver that is configured to receive commands from an earth station, a transmitter that is configured to transmit data to the earth station, and a processor, operably coupled to the receiver and the transmitter, that is configured to:

process the commands from the earth station and produces therefrom sub-system commands, process communications from the one or more spacecraft sub-systems and produces therefrom the data that is transmitted to the earth station;

wherein:

the standard electrical interface is operably coupled to the processor, the power management system, and the one or more spacecraft sub-systems, and is configured to:

provide the sub-system commands to the one or more spacecraft sub-systems in a standard format, receive the communications from the one or more spacecraft sub-systems in the standard format, receive the variable power input from a power generation system, communicate the variable power input to the power management system, receive the regulated output from the power management system, and provide the regulated power output to the one or more spacecraft sub-systems.

3. The spacecraft kernel of claim 2, wherein the variable power input is intermittent, and the power management system further includes a storage system that augments the variable power input to provide the regulated power output continuously.

4. The spacecraft kernel of claim 1, wherein the transmitter and the receiver are configured to communicate with the earth station via an antenna system, and the standard electrical interface is configured to operably couple the transmitter and the receiver to the antenna system.

5. The spacecraft kernel of claim 1, wherein
the processor is also configured to facilitate control of the one or more spacecraft sub-systems.

6. The spacecraft kernel of claim 1, wherein
the standard format conforms to at least one of: a CANbus standard, an IEEE-1394 standard, an RS-485 standard, a Mil-Std 1553/1773 standard, and an $I^2C$ standard.

7. A spacecraft system comprising:
a mission-specific system that includes:
   a collection system that is configured to collect mission data, and
   a first processor, operably coupled to the collection system, that is configured to process the mission data and produces therefrom data items in a standard format;
a kernel that includes:
   a second processor that is configured to process the data items from the mission-specific system in the standard format and to produce therefrom processed data, and
   a transmitter, operably coupled to the second processor, that is configured to transmit the processed data to an earth station; and
an electrical interface, operably coupled to the mission-specific system and the kernel, that is configured to communicate the data items from the mission-specific system to the kernel in the standard format.

8. The spacecraft system of claim 7, wherein:
the kernel further includes
   a receiver, operably coupled to the second processor, that is configured to receive commands from the earth station, and
wherein
   the second processor is configured to process the commands from the earth station and produce therefrom at least one mission-specific command in the standard format;
   the electrical interface is configured to communicate the at least one mission-specific command from the second processor to the mission-specific system in the standard format; and
   the first processor is configured to receive the at least one mission-specific command from the electrical interface and effect therefrom a modification of at least one parameter of the collection system.

9. The spacecraft system of claim 8, further including
an attitude determination and control system that is configured to effect a motion of the spacecraft system,
wherein:
   the second processor is also configured to produce at least one attitude command in the standard format from the commands from the earth station, and
   the electrical interface is configured to communicate the at least one attitude command from the second processor to the attitude determination and control system in the standard format; and
   the attitude determination and control system is configured to effect at least one motion of the spacecraft system in response to the at least one attitude command.

10. The spacecraft system of claim 7, further including
an attitude determination and control system that is configured to effect a motion of the spacecraft system,
and wherein:
   the kernel further includes
      a receiver, operably coupled to the second processor, that is configured to receive commands from the earth station; and
      the second processor is configured to process the commands from the earth station to produce at least one attitude command in the standard format, and
   the electrical interface is configured to communicate the at least one attitude command from the second processor to the attitude determination and control system in the standard format; and
   the attitude determination and control system is configured to effect at least one motion of the spacecraft system in response to the at least one attitude command.

11. The spacecraft system of claim 7, wherein
the standard format conforms to at least one of: a CANbus standard, an IEEE-1394 standard, an RS-485 standard, a Mil-Std 1553/1773 standard, and an $I^2C$ standard.

12. A method of producing a spacecraft system including:
providing a kernel that includes
   a communications system for communicating to an earth station and
   a standard electrical interface
      for receiving data items from a spacecraft-specific system for communication to the earth station,
      for receiving variable power from the spacecraft-specific system, and
      for communicating regulated power to the spacecraft-specific system,
providing the spacecraft-specific system that includes
   a power generating system that is configured to provide the variable power to the standard electrical interface, and
   a mission-specific system that receives the regulated power from the standard electrical interface and provides the data items to the standard electrical interface,
attaching the spacecraft-specific system to the kernel via the standard electrical interface.

13. The spacecraft kernel of claim 2, wherein
the transmitter and the receiver are configured to communicate with the earth station via an antenna system, and
the standard electrical interface is configured to operably couple the transmitter and the receiver to the antenna system.

14. The spacecraft kernel of claim 2, wherein
the processor is also configured to facilitate control of the one or more spacecraft sub-systems.

15. The spacecraft kernel of claim 2, wherein
the standard format conforms to at least one of: a CANbus standard, an IEEE-1394 standard, an RS-485 standard, a Mil-Std 1553/1773 standard, and an $I^2C$ standard.

16. A spacecraft system comprising:
a mission-specific system that includes:
   a collection system that is configured to collect mission data, and
   a first processor, operably coupled to the collection system, that is configured to process the mission data and produces therefrom data items in a standard format;

a kernel that includes:
  a power management system that is configured to receive a variable power input and produces therefrom a regulated power output,
  a second processor that is configured to process the data items from the mission-specific system in the standard format and to produce therefrom processed data, and
  a transmitter, operably coupled to the second processor, that is configured to transmit the processed data to an earth station; and
an electrical interface, operably coupled to the mission-specific system and the kernel, that is configured to:
  communicate the data items from the mission-specific system to the kernel in the standard format
  receive the variable power input from a power generation system, communicate the variable power input to the power management system,
  receive the regulated output from the power management system, and provide the regulated power output to the one or more spacecraft sub-systems.

17. The spacecraft system of claim 16, wherein:
the kernel further includes
  a receiver, operably coupled to the second processor, that is configured to receive commands from the earth station, and
wherein
  the second processor is configured to process the commands from the earth station and produce therefrom at least one mission-specific command in the standard format;
  the electrical interface is configured to communicate the at least one mission-specific command from the second processor to the mission-specific system in the standard format; and
  the first processor is configured to receive the at least one mission-specific command from the electrical interface and effect therefrom a modification of at least one parameter of the collection system.

18. The spacecraft system of claim 17, further including an attitude determination and control system that is configured to effect a motion of the spacecraft system, wherein:
  the second processor is also configured to produce at least one attitude command in the standard format from the commands from the earth station, and
  the electrical interface is configured to communicate the at least one attitude command from the second processor to the attitude determination and control system in the standard format; and
  the attitude determination and control system is configured to effect at least one motion of the spacecraft system in response to the at least one attitude command.

19. The spacecraft system of claim 16, further including an attitude determination and control system that is configured to effect a motion of the spacecraft system, and wherein:
  the kernel further includes
    a receiver, operably coupled to the second processor, that is configured to receive commands from the earth station; and
    the second processor is configured to process the commands from the earth station to produce at least one attitude command in the standard format, and
  the electrical interface is configured to communicate the at least one attitude command from the second processor to the attitude determination and control system in the standard format; and
  the attitude determination and control system is configured to effect at least one motion of the spacecraft system in response to the at least one attitude command.

20. The spacecraft kernel of claim 16, wherein
the standard format conforms to at least one of: a CANbus standard, an IEEE-1394 standard, an RS-485 standard, a Mil-Std 1553/1773 standard, and an $I^2C$ standard.

* * * * *